(12) United States Patent
Saunders et al.

(10) Patent No.: US 10,885,808 B2
(45) Date of Patent: Jan. 5, 2021

(54) CURATING TUTORIALS BASED ON HISTORIC USER DATA

(71) Applicant: INTERNATIONAL BUSINESS MACHINES CORPORATION, Armonk, NY (US)

(72) Inventors: Heather L. Saunders, Raleigh, NC (US); Alexandra D. Markello, Fayetteville, NC (US); Dana L. Price, Surf City, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 424 days.

(21) Appl. No.: 15/718,085

(22) Filed: Sep. 28, 2017

(65) Prior Publication Data

US 2019/0096280 A1    Mar. 28, 2019

(51) Int. Cl.
*G09B 19/00* (2006.01)
*G09B 5/02* (2006.01)
*G09B 5/12* (2006.01)
*H04L 29/08* (2006.01)
*G06F 11/00* (2006.01)

(52) U.S. Cl.
CPC .......... *G09B 19/0053* (2013.01); *G06F 11/00* (2013.01); *G09B 5/02* (2013.01); *G09B 5/12* (2013.01); *G09B 5/125* (2013.01); *G09B 19/00* (2013.01); *H04L 67/22* (2013.01); *H04L 67/303* (2013.01); *H04L 67/306* (2013.01); *H04L 67/10* (2013.01)

(58) Field of Classification Search
CPC ...... G09B 19/00; G09B 19/0053; G09B 5/02; G09B 5/12; G09B 5/125
See application file for complete search history.

(56) References Cited

U.S. PATENT DOCUMENTS

| | | | |
|---|---|---|---|
| 6,029,177 A * | 2/2000 | Sadiq | G06F 9/524 |
| 6,262,730 B1 | 7/2001 | Horvitz et al. | |
| 7,020,876 B1 * | 3/2006 | Deitz | G05B 19/41865 718/100 |
| 9,449,524 B2 | 9/2016 | Bruce et al. | |
| 2004/0148386 A1 * | 7/2004 | Bushmitch | H04L 29/06 709/224 |

(Continued)

*Primary Examiner* — Eddy Saint-Vil
(74) *Attorney, Agent, or Firm* — William Hartwell; Andrew D. Wright; Roberts Calderon Safran & Cole, P.C.

(57) ABSTRACT

Systems and methods for curating tutorials based on historic user data are disclosed. In embodiments, a computer-implemented method, comprises: receiving login information from a user device via a network connection, the login information identifying a user of the user device; determining current conditions of the user device, including features of the user device; determining features of one or more devices or software previously utilized by the user based on historic user data in a profile of the user; identifying one or more differences by comparing the features of the user device with the features of the one or more devices or software previously utilized by the user; determining that tutorials include a relevant tutorial related to the identified one or more differences; and sending an option to initiate the relevant tutorial to the user device via the network connection.

19 Claims, 4 Drawing Sheets

(56) References Cited

U.S. PATENT DOCUMENTS

| | | | |
|---|---|---|---|
| 2007/0166672 A1* | 7/2007 | Morita | G09B 19/00 |
| | | | 434/118 |
| 2007/0281731 A1 | 12/2007 | Attride et al. | |
| 2010/0146500 A1 | 6/2010 | Joubert et al. | |
| 2010/0192063 A1* | 7/2010 | Saoumi | G09B 19/0053 |
| | | | 715/707 |
| 2013/0311481 A1* | 11/2013 | Bhatt | G06F 16/2228 |
| | | | 707/741 |
| 2014/0188932 A1* | 7/2014 | Kalita | G06Q 10/10 |
| | | | 707/770 |
| 2014/0199664 A1* | 7/2014 | Sadeh-Koniecpol | G09B 5/00 |
| | | | 434/118 |
| 2014/0344257 A1* | 11/2014 | Loredo | G06Q 10/10 |
| | | | 707/723 |
| 2015/0019989 A1* | 1/2015 | Rogers | G06F 9/453 |
| | | | 715/745 |
| 2015/0169336 A1* | 6/2015 | Harper | G10L 15/22 |
| | | | 715/706 |
| 2015/0199615 A1 | 7/2015 | Amendjian et al. | |
| 2016/0062579 A1 | 3/2016 | Lee | |
| 2016/0314697 A1* | 10/2016 | Krosky | G09B 5/02 |
| 2017/0374076 A1* | 12/2017 | Pierson | H04L 63/0236 |
| 2018/0081496 A1* | 3/2018 | Bhardwaj | G06F 3/0481 |
| 2018/0189077 A1* | 7/2018 | Gupta | G09B 7/00 |
| 2018/0284959 A1* | 10/2018 | Alphin, III | G06F 16/2228 |

* cited by examiner

CURATING TUTORIALS BASED ON HISTORIC USER DATA

BACKGROUND

The present invention relates generally to managing tutorials and, more particularly, to curating tutorials based on historic user data.

As electronic devices and associated software become more complex and offer a user more features or functions, various methods have been developed to provide users with the instructional support necessary to fully understand and utilize the device and/or associated software. Many different types of instructional support have been developed to educate users regarding software applications or electronic devices on which they reside. One type of instructional support is a user tutorial specific to one or more software applications or electronic devices. Often, these tutorials are predetermined stored tutorials that are designed to address a particular topic or feature without regard for a user's knowledge level. Tutorials may be prepared by the source of a software application or electronic device, or by a third party. Tutorials may be specific to the particular electronic device or piece of software to which they relate, including to a particular make, model, version, year of production, etc. Often, it is helpful to manually or automatically activate a user tutorial to guide a user through the functionality of a new device or new piece of software on the device. There are many existing methods of utilizing tutorials, including manual initiation of a tutorial by a user and automatic initiation of a tutorial when certain electronic device or software conditions are met.

SUMMARY

In an aspect of the invention, a computer-implemented method includes: receiving, by a computing device, login information from a user device via a network connection, the login information identifying a user of the user device; determining, by the computing device, current conditions of the user device, including features of the user device; determining, by the computing device, features of one or more devices or software previously utilized by the user based on historic user data in a profile of the user; identifying, by the computing device, one or more differences by comparing the features of the user device with the features of the one or more devices or software previously utilized by the user; determining, by the computing device, that tutorials include a relevant tutorial related to the identified one or more differences; and sending, by the computing device, an option to initiate the relevant tutorial to the user device via the network connection.

In another aspect of the invention, there is a computer program product for curating tutorials based on historic user data. The computer program product comprises a computer readable storage medium having program instructions embodied therewith. The program instructions are executable by a computing device to cause the computing device to: receive login information from a remote user device via a network connection, the login information identifying a user of the remote user device; receive current conditions from the remote user device via the network connection; determine features of the remote user device based on the received current conditions; access a profile of the user; determine features of one or more devices or software previously utilized by the user based on historic user data in the profile of the user; identify one or more differences by comparing the features of the remote user device with the features of the one or more devices or software previously utilized by the user; determine that one or more tutorials are relevant tutorials related to the identified one or more differences; and send one or more options to initiate the one or more relevant tutorials to the remote user device via the network connection.

In another aspect of the invention, there is a system for curating tutorials based on historic user data. The system includes a CPU, a computer readable memory and a computer readable storage medium associated with a computing device; program instructions to initiate a tutorial curation event based on the determining that a tutorial initiation event has occurred on the computing device; program instructions to determine features of the computing device; program instructions to access a remote profile of the user via a network connection; program instructions to determine features of one or more devices or software previously utilized by the user based on historic user data in the profile of the user; program instructions to identify, after determining that a tutorial initiation event has occurred, one or more differences by comparing the features of the computing device with the features of the one or more devices or software previously utilized by the user; program instructions to determine that a tutorial is a relevant tutorial related to the identified one or more differences; and program instructions to display an option to initiate the relevant tutorial to the user; wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to managing tutorials and, more particularly, to curating tutorials based on historic user data. In embodiments, a system is provided to present a user who is encountering a new electronic device, electronic device feature, software program, or software program feature with appropriate help or tutorials based on the user's history with similar devices or programs. In aspects, modules of the present invention curate (select, organize and present) tutorials based on historic user device data pulled from one or more sources. As used herein the term tutorial refers to a method of transferring knowledge, and may be understood to include interactive software tutorials or other methods of conveying helpful educational content to a user. In embodiments, a system of the invention determines what devices or software of the same or similar type, if any, have been utilized or encountered by a user, determines what features a user has already participated in a tutorial for, and filters stored tutorials to only show the user things that have changed or are new to the particular generation of user device or software. In aspects, the invention is a system in software that can be run alongside other software programs in an electronic device (e.g., computer, smartphone, vehicle, etc.).

Advantageously, embodiments of the invention facilitate faster learning of previously unknown or altered user device features, by not wasting a user's time on features they have already encountered. The term feature(s) as used herein refers to functions and characteristics of an electronic user device and any of its associated software (i.e., software configured for use with the electronic user device). In aspects, features of an electronic user device may be associated with various tutorials configured to educate a user regarding those features. For example, an electronic user device in the form of a smartphone may include features such as particular voice commands, software applications, Bluetooth functions, user interface configurations, and others, which are associated with stored tutorials to educate a user regarding those features. In aspects, a system of the invention may monitor and profile a user's current devices and configurations (e.g., a user's current smartphone or vehicle, current software installed, etc.), and maintain a record of similar devices and/or software used by the user (e.g., past smartphones owned by the user, past vehicles driven by the user, past software utilized by the user, etc.). A system of the invention may run as a standalone application on a smartphone or other device that the user can activate and enter in a current device and/or software configuration.

Embodiments of the present invention constitute improvements to the technical field of electronic computing devices by providing new functionality to electronic computing devices. For example, embodiments of the invention enable user-specific tutorial curation or filtering through the cognitive processing of historic user data to overcome the problem of unnecessary or over burdensome electronic device and/or software tutorials (manually or automatically initiated). Embodiments of the present invention are beneficial in that: a user does not have to sit through or exit out of tutorials or features they already know how to use; a user does not have to activate tutorials for new features, since the system may automatically activate tutorials upon detecting that the new features are different from features previously known to the user (e.g., through the user's previous experience with other devices or versions of the devices); a user will not be restricted by perceived skill levels as to which features they can explore in tutorials; and a user does not have to look up which feature(s) are new to software and/or a device and how to use them.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
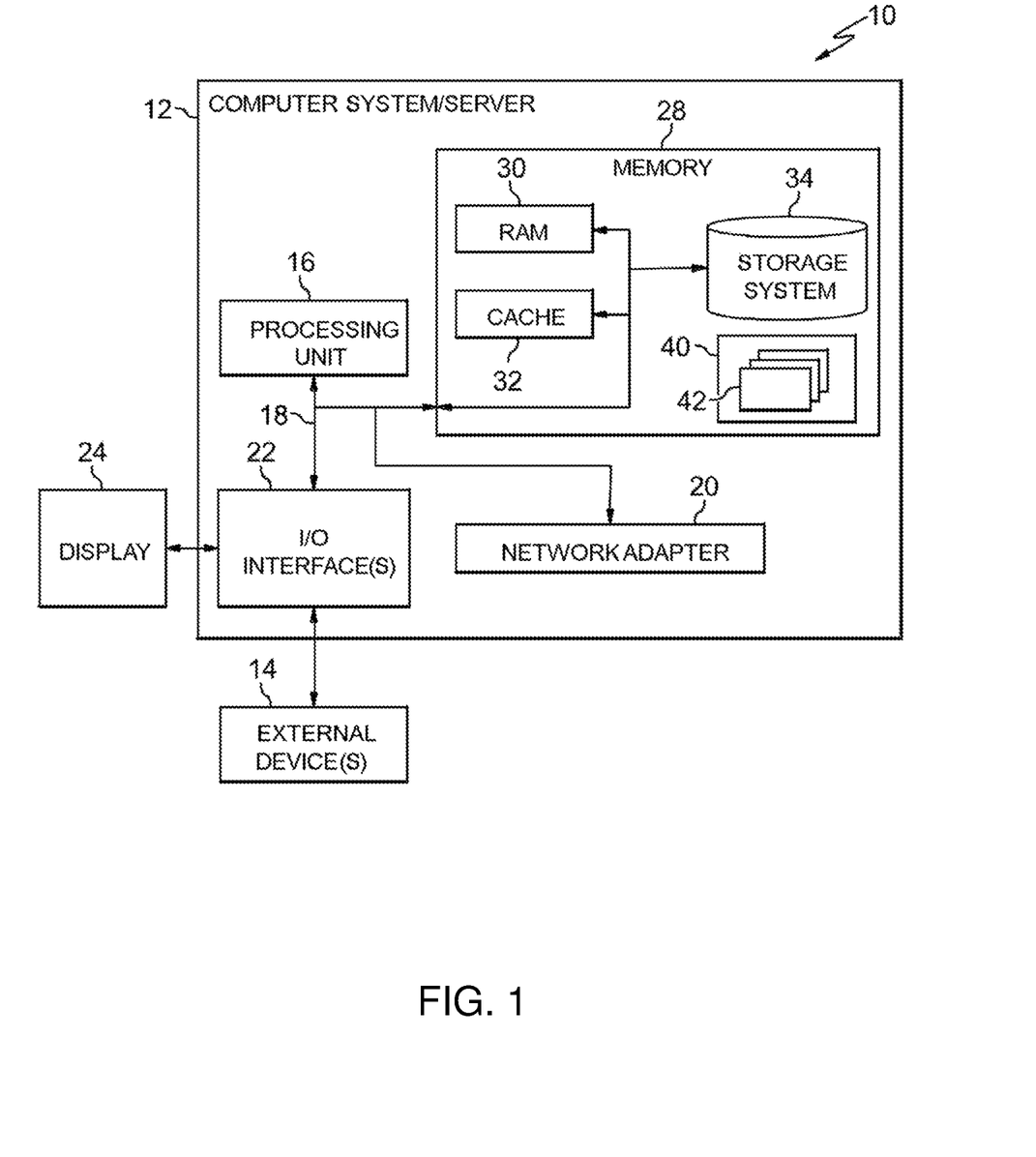
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/ Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
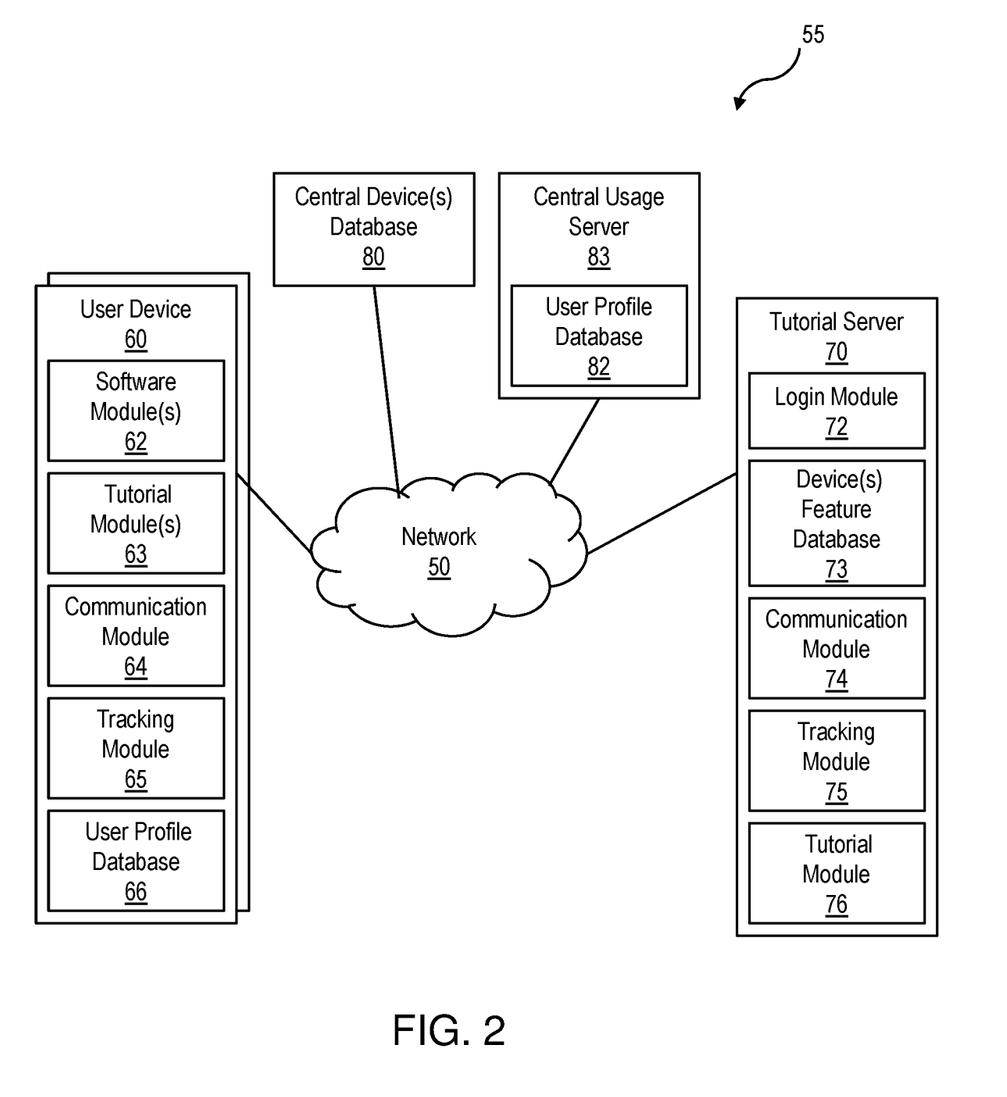
FIG. 2 shows an exemplary environment in accordance with aspects of the invention.

FIG. 2 shows an exemplary environment in accordance with aspects of the invention. The environment represents a system 55 for curating tutorials based on historic user experience data, and includes one or more user computing devices 60 (hereafter user device 60) connected to a network 50. The user device 60 may be in the form of the computing device 12 of FIG. 1, and may be a desktop computer, laptop computer, tablet computer, smartphone, an automobile computer, etc. In embodiments, the user device 60 includes one or more software modules 62 and one or more tutorial modules 63. It should be understood that software modules 62 may be any type of software for use on the user device 60. For example, the software module 62 may include conventional software for use with a smartphone. Likewise, the tutorial module 63 may include any type of tutorial for use with the user device 60. For example, the tutorial module 63 may include conventional interactive tutorials for use with a smartphone, tutorials for an automobile, or any other type of instructional support configured for a particular type of user device 60. In embodiments, the user device 60 includes one or more of: a communications module 64, a tracking module 65, and a user profile database 66, the details of which are discussed below.

The network 50 may be any suitable communication network or combination of networks, such as a local area network (LAN), a general wide area network (WAN), and/or a public network (e.g., the Internet). In embodiments, the user device 60 utilizes the communications module 64 to communicate with one or more remote computing devices through the network 50. In aspects, the user device 60 is in communication with a tutorial server 70 configured to perform one or more functions in accordance with embodiments of the invention.

Still referencing FIG. 2, the tutorial server 70 may include aspects of the computing device 12, and may be configured as a special purpose computing device that is part of a service provider's infrastructure. For example, the tutorial server 70 may be configured to provide tutorial support to customers of a network provider. In embodiments, the tutorial server 70 includes a login module 72 configured to enable one or more customers to securely access tutorial services through their computing devices (e.g., user device 60). In aspects, the tutorial server 70 includes a device feature database 73 configured to obtain and store data regarding one or more electronic devices and/or software for use on the one or more electronic devices. For example, the tutorial server 70 may utilize a communication module 74 to gather information regarding the make, model, year, and/or generation of one or more electronic devices and their associated software, as well as features and functionality associated with the one or more electronic devices and their associated software, from a central device database 80 through the network 50. The central device database 80 may be a database maintained, for example, by a manufacturer or provider of electronic devices and/or software (e.g., smartphone provider).

In embodiments, the tutorial server 70 includes a tracking module 75 configured to gather historic user data regarding the user's experience with one or more electronic devices and/or software associated with the one or more electronic devices. For example, the tracking module 75 may obtain information regarding the make, model and functionality of one or more smartphones that were previously owned by a user, and store the information in a database of the tracking module 75. The tracking module 75 may obtain information regarding historic usage data of one or more users from a number of sources. For example, the tracking module 75 may obtain information regarding a user's historic electronic device and software usage through a user profile database 82 of a central usage server 83 configured to store such data. The central usage server 83 may be, for example, the server of a network provider, and may include stored data regarding customers' previously owned smartphones or devices and associated software.

In aspects, the tutorial server 70 includes a tutorial module 76 configured to obtain and compare features of a current user device (e.g., user device 60) with features of previously utilized user devices or associated software (e.g., historic user data within the tracking module 75) in order to identify one or more differences between the historic user data and the current user device. For example, the tutorial module 76 may identify differences in functionality of a current smartphone of a user as compared with smartphones that were previously utilized by the user. In aspects, the user device 60 may receive tutorial options from the tutorial module 76 via the network 50 based on the identified differences.

In alternative embodiments, the user device 60 includes its own tracking module 65 configured to gather historic user data regarding the user's experience with one or more electronic devices and/or software associated with the one or more electronic devices. For example, the tracking module 65 may obtain information (e.g., through the central usage server 83 and/or central device database 80) regarding the make, model and functionality of one or more smartphones that were previously owned by a user, and store the information in a database of the tracking module 65.

In aspects, the user device 60 includes its own tutorial module 63 configured to obtain and compare features of the user device 60 with historic user data within the tracking module 65 in order to identify one or more differences between the historic user data and the current user device. For example, the tutorial module 63 may identify differences in functionality of a current smartphone of a user as compared with smartphones that were previously utilized by the user. In aspects, the tutorial module 63 presents tutorial options to a user through an interface of the user device 60 based on the identified differences.

In embodiments, the tracking module 65 of the user device is configured to build a user profile based on a user's historic usage of one or more user devices and/or software. In aspects, the tracking module 65 saves user profile data in the user profile database 66 of the user device 60. Alternatively, the user device 60 may obtain user profile data from the user profile database 82 of the remote central usage server 83.

In embodiments, system 55 may include additional or fewer components than those shown in FIG. 2. In embodiments, separate components may be integrated into a single computing component or module. Additionally, or alternatively, a single component may be implemented as multiple computing components or modules. Each module of the user device to (e.g., modules 62-65) may include one or more program modules (e.g., program module 42 of FIG. 1) executed by the user device 60. Likewise, each module of the server 70 (e.g., modules 72 and 74-76) may include one or more program modules executed by the server 70.

The quantity of devices and/or networks in the system 55 is not limited to what is shown in FIG. 2. In practice, the system 55 may include additional devices and/or networks; fewer devices and/or networks; different devices and/or networks; or differently arranged devices and/or networks than illustrated in FIG. 2. Also, in some implementations, one or more of the devices of the system 55 may perform one or more functions described as being performed by another one or more of the devices of the system 55. Devices of the system 55 may interconnect via wired connections, wireless connections, or a combination of wired and wireless connections.

Figure 3:
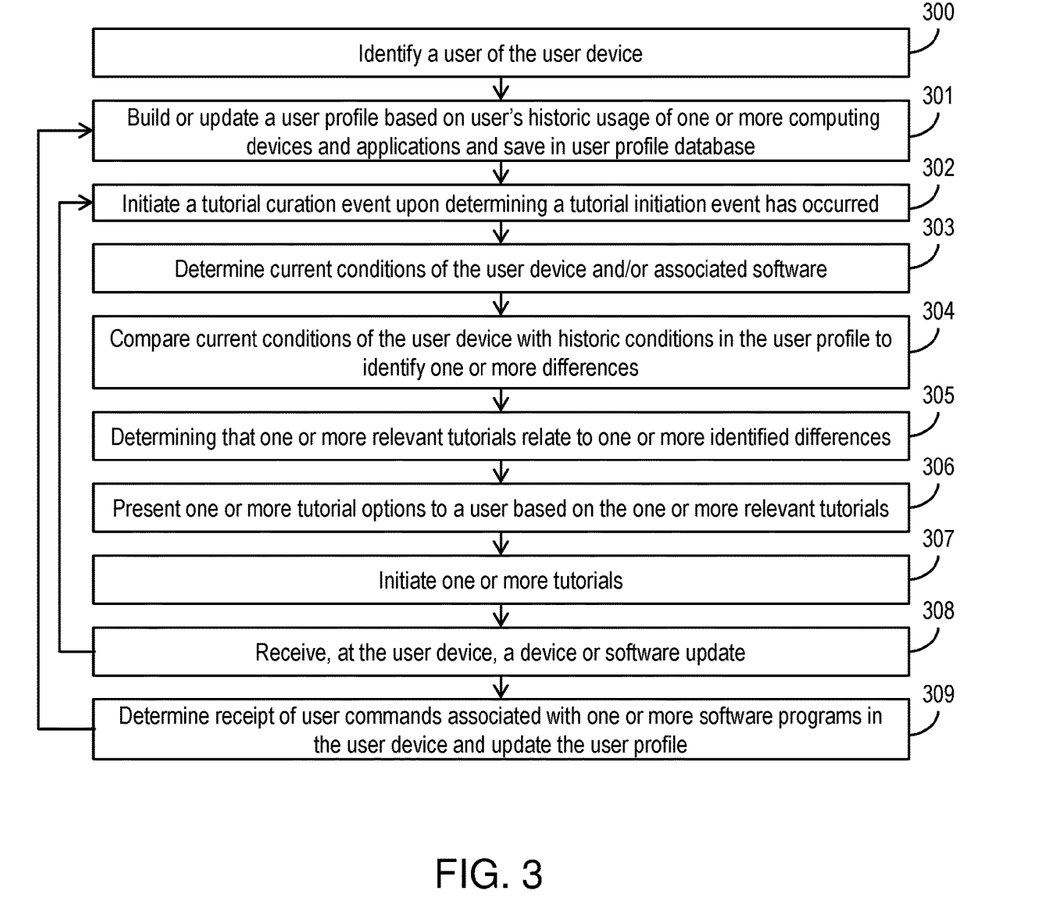
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the system 55 identifies a user of the user device 60. Step 300 may be implemented by the user device 60, or by the tutorial server 70. In embodiments, the system 55 initiates identification of the user upon startup of the user device 60 or upon a user's initiation of a session (e.g., the user logging into the system 55). In embodiments, the user device 60 or tutorial server 70 recognizes the identity of the user through an existing identification method of the user device 60 or tutorial server 70, such as biometric identification (e.g., retinal password), numeric or text-based username or password input, detection of a network address, detection of a cell phone number, or other system identification (e.g., vehicle ID number, laptop media access control address, software version number, etc.).

At step 301, the system 55 builds or updates a user profile including data regarding the user's historic electronic device and software application use and/or skill level, and stores the user profile in a database. In aspects, step 301 is performed based on the identification of the user at step 300. In embodiments, step 301 is performed by a third party's central usage server 83, such as a network provider, and stored in the user profile database 82 of the central usage server 83. Alternatively or concurrently, the user profile may be built by the user device 60 itself, and stored in the user profile database 66 of the user device 60. For example, the tracking module 65 of the user device 60 may build a user profile. In embodiments, the user profile is built by the tracking module 75 of the tutorial server 70. The user profile may be generated based on a number of different sources of information. The user profile may be built based on: user purchase history (e.g., cell phone company records of registered devices, rental and purchased vehicle records, etc.); previously identified devices and/or software as entered by a user (e.g., user enters the smartphones they have owned in a questionnaire); installation history for software on a current user device 60 (if embedded); app store history and devices the apps were installed on; and other information. System 55 may infer certain information, such as a user's historic usage of one or more devices or software from the user's purchase history. For example, the system 55 may infer that a user who has purchased a particular software application for a user device (e.g., user device 60) has utilized the functions of the software application.

The present invention is not intended to be limited to a particular method of generating a user profile in step 301. In aspects of the invention, the user profile includes historic user data regarding electronic devices and associated software. The term historic user data as used herein refers to the make, model, generation, production or release year, functions, design features, or other information regarding the features and identity of electronic devices and/or associated software previously utilized by the user. Historic user device information (e.g., historic user data) may be stored in a variety of ways, such as in a memory of the user device 60. In embodiments, a plurality of user profiles are stored in a central repository (e.g., central usage server 83) where the historic usage data for each individual user device (e.g., user device 60) is uploaded, pulled into, or synched with the central repository. It should be understood that the user profile of the present invention may be periodically or continuously updated, based on incoming usage data, as will be discussed in more detail below.

At step 302, the system 55 initiates a tutorial curation event based on the determination that a tutorial initiation event has occurred. Step 302 may be performed by the user device 60 or by the tutorial server 70. For example, in embodiments, the user device 60 or the tutorial server 70 initiates a tutorial curation event as outlined by steps 303-307 below upon determining that one of the following tutorial initiation events (triggering events) has occurred: a user accesses or requests a tutorial function of the user device 60 or tutorial server 70 (e.g., a user selects to initiate tutorials or tutorial options); a new user device (e.g., 60) or feature is being utilized for the first time; new software of a user device (e.g., 60) is being utilized for the first time; the user device 60 has received one or more updates (hardware or software); or a startup of the user device 60 is initiated. In aspects, step 302 is performed by one of tutorial modules 63 and 76. In embodiments, a user is presented with an option to initiate a tutorial event. In aspects, the tutorial event will be initiated when one or more triggering events has occurred and the user selects an option to initiate a tutorial event when presented with the option through a user interface of the user device 60.

At step 303 of FIG. 3, the system 55 determines current conditions of the user device 60 and/or associated software. Step 303 may be implemented by the user device 60 or by the tutorial server 70. In aspects, step 303 is performed by one of the tracking modules 65 and 75. As used herein the term current conditions refers to the make, model, generation, production or release year, functions, design features, or other information regarding the features and identity of the user device 60 and/or associated software (e.g., internal or external software utilized by and/or associated with the user device 60). The system 55 can use a variety of methods to determine the current conditions of the user device 60. For example, the user device 60 may prompt the user for information about the user device 60 or software associated with the user device 60 through a user interface of the user device 60. Alternatively, the user device 60 may recognize current conditions through data stored on the user device 60 or stored remotely. In embodiments, the user device 60 or the tutorial server 70 accesses information (e.g., user manuals, device or software specifications, software code, etc.) regarding the user device 60 and/or associated software on the remote central device database 80 via the network 50.

At step 304 of FIG. 3, the system 55 compares current conditions of the user device 60 with historic conditions of devices and/or software in the user profile of step 301. In performing step 304, the system 55 may first identify previously used electronic devices and/or software that is similar or related to the user device 60 and associated software. For example, the system 55 may identify the user device 60 at step 303 as a particular model of smartphone, and may compare the current conditions of the user device 60 to the historic conditions of an earlier generation of the same model of smartphone, which was previously utilized by the user. Step 304 may be performed by the user device 60 or by the tutorial server 70. In embodiments, step 304 is performed by the tracking module 65 of the user device 60 or the tracking module 75 of the tutorial server 70.

In aspects, the system 55 compares the current conditions of the user device 60 with the historic conditions within the user profile, taking into account: upgrades or changes to features; new features; features the user did not use or access on a previous device(s); or features that are significantly different on the user device 60 as compared to one or more previous devices and/or associated software. A variety of methods may be utilized for determining whether features of previous devices and associated software were accessed. For example, the system 55 may determine that features were not used or accessed by a user based on tutorials for earlier devices/software that were dismissed by the user, or a user's tracked device usage history. Likewise, a variety of methods may be utilized to determine that features are significantly different as between the user device 60 and previous devices, such as: the use of different hotkeys or button for the same function; different default behaviors; different degrees of notifications that can be enabled/disabled for the same functions; or different personal agent (e.g., Google's OK Google, Apple's Ski, Amazon's Alexa, etc.) activations/ commands (e.g., voice-activated commands). In one example, the system 55 may compare a first mail application (in the user profile) with a new mail application (used by the user device 60) and determine that the user knows to swipe right to delete content using the first mail application, but must swipe left to delete content using the new mail application, thus determining that a difference exists between the first mail application and the new mail application.

Still referring to step 304 of FIG. 3, there are a number of methods that may be utilized by the system 55 to determine and store user device and/or software features for use in comparing current conditions in accordance with step 304. For example, the central device database 80 may constitute a database of features listed in a specific format for software and electronic devices, wherein electronic devices can be compared to one another by simply comparing two lists. In another example, the system 55 may utilize natural language processing (NLP) to automatically compare text-based documents for the relevant electronic device and/or software applications (e.g., change logs or user device manuals) to identify new or different features. In aspects, the tracking module 65 of the user device 60 or the tracking module 75 of the tutorial server 70 may utilize a NLP module (not shown) to compare current conditions with historic conditions of electronic devices and/or software listed in the user profile. Advantageously, utilizing the NLP module enables embodiments of system 55 to work from existing materials (e.g., available digital user manuals) that are standard in an industry without participation from various software or device creators. In embodiments, the comparison of step 304 is not performed for every device or software in existence, but instead is performed based on the entire stored user profile (user history) in real time to find differences and subsequently present curated tutorials to the user as detailed further below.

At step 305, the system 55 determines that one or more relevant tutorials relate to one or more differences (e.g., new or different features) identified at step 304. Step 305 may be performed by the user device 60 or the tutorial server 70. In embodiments, the tutorial module 63 of the user device 60 or the tutorial module 76 of the tutorial server 70 determines that a relevant tutorial saved within a database relates to one or more of the differences identified at step 304. For example, the tracking module 65 of the user device 60 may determine at step 304 that the user device 60 is configured to respond to a first set of voice commands that is different from a second set of voice commands that were utilized by a previous model of the user device 60. In this example, the user device 60 may determine that a relevant pre-existing tutorial for the first set of voice commands is saved in a database of the tutorial module 63, and should be presented to the user.

At step 306, the system 55 presents one or more tutorial options to a user based on the one or more relevant tutorials determined at step 305. In embodiments, the tutorial module 63 of the user device 60 presents one or more tutorial options to a user through a user interface of the user device 60. In embodiments, the tutorial module 76 of the tutorial server 70 sends the one or more tutorial options to the user device 60 through the network 50, to be presented to the user through a user interface of the user device 60. In aspects, the one or more tutorial options comprise one or more options to initiate the one or more relevant tutorials determined at step 305. For example, the user device 60 may present the user with a pop-up window indicating that a new voice command feature is available, and enabling the user to click on a link to initiate a tutorial on the new voice command feature. In embodiments, the one or more tutorial options are in the form of one or more tutorials presented to the user. For example, a tutorial (text-based, audio-based, image-based, or combinations thereof) may be presented and/or initiated automatically to the user in accordance with step 306.

Optionally, at step 307, the system 55 initiates one or more tutorials (e.g., presents one or more tutorials to a user) based on a selection of a tutorial option presented to the user in accordance with step 306. For example, the user device 60 may present a user with an option (in accordance with step 306) to watch a tutorial on a voice command feature identified in step 305 as being different from a voice command feature previously utilized by the user, and upon the user selecting the option, the user device 60 may present the tutorial to the user in accordance with step 307. In embodiments, the user device 60 may communicate a selection of a tutorial option to the tutorial server 70, which may then supply the user device 60 with an associated tutorial for display in accordance with step 307.

At step 308 of FIG. 3, the user device 60 receives a device or software update. By way of example, the user device 60 may be a smartphone that receives a routine software update from a service provider. In embodiments, the receipt of an update at step 308 is a tutorial initiation event, as determined at step 302. Accordingly, in embodiments, the receipt of updates at the user device 60 at step 308 causes the system 55 to cycle through steps 303-306. Thus, it can be understood that any differences in function between the software updates received and previous versions of software on the user device 60 may cause the user device 60 to present tutorial options to a user (e.g., to provide the user with the option to review one or more tutorials relevant to the software update) in accordance with step 306.

At step 309, the user device 60 may determine the receipt of user commands associated with one or more features or functions of the user device 60 or associated software, and utilize the information to update the user profile in accordance with step 301. For example, the tutorial module 63 of the user device 60 may determine that a user has selected a tutorial on a new voice command feature, and may determine based on the received command that the user has now utilized the new voice command feature, whereupon the feature is added to the user profile as a historic feature with which the user is familiar. In accordance with embodiments of the invention, the user profile may electronically tag or flag a feature of the user device 60 or software associated with the user device 60 as familiar to a user, and/or may also electronically tag or flag one or more tutorials associated with the familiar feature as being familiar to the user. The flagged features and/or tutorials may then be recognized by the system 55 to filter out tutorials during the determination of one or more relevant tutorials at step 305. For example, a tutorial presented to a user on a particular voice command feature may be tagged as being presented to the user, such that during future tutorial events, the system 55 will recognize that the tutorial is not to be considered in relation to the particular voice command feature due to having been previously presented to the user, and will be excluded from any results of step 305.

Still referring to FIG. 3, the system 55 may be utilized without graphical user interfaces. In embodiments, the user device 60 of the system 55 may be in the form of an on-board computer in a vehicle, and tutorials may be provided in accordance with FIG. 3 to provide information regarding vehicle function (e.g., new control options on a steering wheel of the vehicle). In embodiments, the system 55 may be utilized in conjunction with a voice controlled user device 60, and tutorials may be provided to a user in accordance with FIG. 3 to inform a user regarding new or updated voice commands for the system 55 (e.g., providing a tutorial on how to play music from a connected stereo using voice commands). In aspects, the user device 60 is in the form of a smart mechanical device, such as a lawn mower, robotic device, etc.

Figure 4:
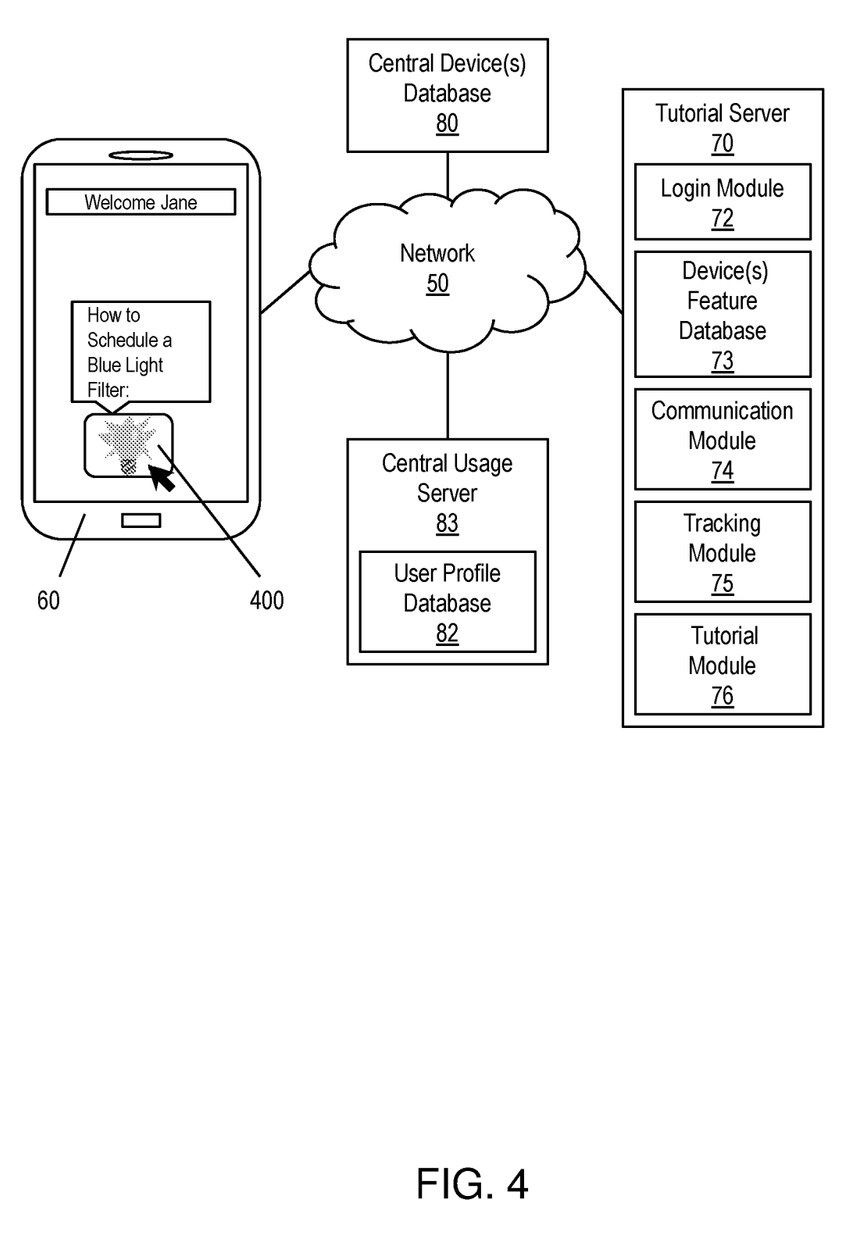
FIG. 4 illustrates an exemplary use scenario in accordance with embodiments of the present invention.

FIG. 4 illustrates an exemplary demo scenario for embodiments of the system 55, and will be discussed with reference to the steps of FIG. 3.

In the scenario of FIG. 4, the system 55 comprises a demonstrations (demo) system utilizing the tutorial server 70 in communication with a plurality of user devices, and the user device 60 is in the form of a smartphone that a user Jane is viewing in a demo mode. In accordance with step 301 of FIG. 3, a user profile for Jane is initially generated based on her historic electronic device and software usage, and the user profile is stored in the central usage server 83. In this scenario, Jane's user profile is generated based on a plurality of input sources, including data regarding a first generation smartphone having a make and model X/Y1 (wherein X refers to the make and Y1 refers to the model) and utilizing an app Z. In order to initiate a demo mode of the user device 60, Jane logs into the demo system through network communication with the tutorial server 70 (e.g., using a browser or from a demo home screen). In this scenario, the tutorial server 70 receives the login information including information identifying Jane as the user of the user device 60. In accordance with step 300 of FIG. 3, the tutorial server 70 identifies Jane based on the login information received. The tutorial server 70 also recognizes the logging in of Jane to the tutorial server 70 as a tutorial initiation event in accordance with step 302 of FIG. 3.

The tutorial server 70 determines a first set of current conditions of the user device 60 through network communication (via network 50) with the user device 60 in accordance with step 303 of FIG. 3. In this scenario, the tutorial server 70 receives a first set of current conditions of the user device 60 from the user device 60, including the make and model X/Y2 (wherein X refers to the make and Y2 refers to the model, which is a newer model than Y1) of the user device 60. The tutorial server 70 utilizes NPL technology to analyze a user manual of the X/Y2 stored in the central device database 80 to create a more detailed list of current conditions (e.g., features such as rear-facing camera, blue light filter, etc), mapping to their respective categories, and stores this information in the device feature database 73 of the tutorial server 70. The tutorial server 70 obtains the more detailed list of current conditions (e.g., additional details regarding features, software, functions, etc.) for the make and model X/Y2 from the device feature database 73. In accordance with step 304 of FIG. 3, the tutorial server 70 identifies that the X/Y1 device and app Z were previously utilized by Jane based on Jane's user profile, and compares the current conditions of the user device 60 (X/Y2 features, software, functions, etc.) obtained from the device feature database 73 with historic conditions (e.g., X/Y1 features, app Z features, etc.) stored in the remote central usage server 83, and identifies differences between the current conditions of the X/Y2 and the historic conditions.

In this example, the tutorial server 70 compares the current conditions of the X/Y2 device with historic conditions of the X/Y1 device, determines that Jane has already accessed or utilized all of the features that are shared between the X/Y1 and X/Y2 devices, and generates a filtered list of new features (filtered current conditions) of the X/Y2 device not shared with the X/Y1 device, including the new features of a rear-facing camera and a blue light filter. The tutorial server 70 then compares the filtered list of new features to historic conditions for devices and/or software saved in Jane's user profile. In this example, Jane has previously utilized app Z, which allows users to filter a phone's blue light for easier night-time viewing. The tutorial server 70 compares the filtered list of new features to the historic conditions in Jane's user profile (including historic conditions related to app Z), and determines that a difference exists between features of the X/Y2 device blue light filter and the app Z blue light filter. More specifically, the tutorial server 70 determines that the blue light filter of the X/Y2 device provides the ability to schedule the blue light to turn off at certain times of the day, which is not a feature enabled by the app Z. The tutorial server 70 then identifies a relevant tutorial stored in the tutorial module 76, which is directed toward educating a user regarding the blue light filter scheduling features of the X/Y2 device, in accordance with step 305 of FIG. 3.

In accordance with step 306 of FIG. 3, the tutorial server 70 sends a relevant tutorial option 400 to the user device 60 for presentation to Jane. Upon Jane's selection of the tutorial option 400, a tutorial on the blue light filter scheduling feature is initiated (presented to Jane) in accordance with step 307 of FIG. 3. The initiation of the blue light filter scheduling tutorial is recognized by the user device 60 at step 309, and the user device 60 will update Jane's user profile in the user profile database 82 to reflect the fact that Jane now has experience with the blue light filter scheduling feature in accordance with step 301. In this way, the system 55 updates Jane's user profile in real time to enable accurate real-time filtering/curation of tutorials by the system 55.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for curating tutorials. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   obtaining, by a computing device, historic usage data of a participant from a profile on a remote central repository on a network, wherein the central repository is synched with a plurality of remote user devices of the participant on the network such that the historic usage data in the central repository is periodically or continuously updated;
   receiving, by the computing device, login information from a current remote user device of the participant via the network, the login information identifying the participant;
   determining, by the computing device, that software of the current remote user device of the participant is being utilized for a first time;
   automatically initiating, by the computing device, an automated tutorial curation event based on the determining that the software of the current remote user device of the participant is being utilizing for the first time, the automated tutorial curation event including:
      determining, by the computing device, current conditions of the current remote user device of the participant, including features of the current remote user device of the participant, by accessing information regarding the current remote user device stored on a remote database via the network, wherein the features comprise functions and characteristics of the current remote user device of the participant and functions and characteristics of all internal or external software utilized by or associated with the current remote user device of the participant;
      identifying, by the computing device, features of the plurality of remote user devices of the participant or software previously accessed by the participant based on the historic usage data;
      determining, by the computing device, features of the plurality of remote user devices of the participant or software previously utilized by the participant based on the historic user data;
      identifying, by a natural language processing module of the computing device, that one or more differences exist between the features of the current remote user device of the participant and the features of the plurality of remote user devices of the participant or software previously utilized or accessed by the participant based on a natural language processing comparison of the features of the current remote user device of the participant with the stored historic usage data in real time;
      determining, by the computing device, that a tutorial in a database is related to the identified one or more differences; and
      sending, by the computing device, an option to initiate the tutorial to the current remote user device of the participant via the network.

2. The method of claim 1, further comprising:
   receiving, by the computing device, a selection of an option from the current remote user device of the participant via the network; and
   sending, by the computing device, the tutorial to the current remote user device of the participant via the network based on receiving the selection of the option.

3. The method of claim 2, further comprising electronically tagging, by the computing device, the tutorial to indicate to the computing device that the tutorial has been presented to the participant and is not to be considered a tutorial related to the identified one or more differences in future determinations by the computing device.

4. The method of claim 2, wherein:
   the determining the current conditions of the current remote user device of the participant comprises analyzing one or more text-based documents with natural language processing to determine the features of the user device of the participant;
   the determining the features of the plurality of remote user devices or software previously utilized by the participant comprises analyzing one or more additional text-based documents with natural language processing to identify the features of the plurality of remote user devices or software; and
   the identifying the one or more differences comprises comparing the features identified from the natural language processing of the one or more text-based documents with the features identified from the natural language processing of the one or more additional text-based documents.

5. The method of claim 1, wherein the building the user profile is based on at least one of the group consisting of: user device purchase history, a user provided list of previously utilized user device or software, installation history for software, and app store data.

6. The method of claim 1, wherein the one or more differences comprise at least one function of the current remote user device of the participant.

7. The method of claim 1, wherein the one or more differences comprise at least one of the group consisting of: different hotkeys or buttons for the same functionality; different default behaviors; different degrees of notification that can be enabled for the same functions; and different personal agent activations or commands.

8. The method of claim 1, wherein the determining the current conditions of the current remote user device of the participant comprises obtaining a make and model of the current remote user device of the participant, and determining the features of the current remote user device based on the make and model.

9. The method of claim 8, further comprising generating a filtered list of new features of the current remote user device of the participant not shared with a previous version of the current remote user device, wherein the identifying the differences comprises comparing the filtered list of the new features of the current remote user device of the participant with the stored historic usage data.

10. A computer program product for curating tutorials based on historic user data, the computer program product comprising a computer readable storage medium having program instructions embodied therewith, the program instructions executable by a computing device to cause the computing device to:
obtain historic usage data for multiple participants from a remote central repository on a network, wherein the central repository is synched with a plurality of remote user devices of the participants on the network such that the historic usage data in the central repository is periodically or continuously updated;
receive login information from a current remote user device of a participant of the multiple participants via a network connection, the login information identifying the participant;
determine that the current remote user device of the participant has received one or more hardware or software updates;
automatically initiate an automated tutorial curation event based on the determining that the current remote user device of the participant has received the one or more hardware or software updates, the automated tutorial curation event including:
determine current conditions of the current remote user device of the participant, including features of the current remote user device based on information regarding the current remote user device stored on a remote database via the network connection;
determine features of the current remote user device of the participant based on the received current conditions, wherein the features comprise functions and characteristics of the current remote user device of the participant and functions and characteristics of software of the current remote user device of the participant;
identify features of one or more user devices or software that have been previously accessed by the participant based on the historic usage data of the participant;
determine features of the one or more user devices or software previously utilized by the participant based on historic user data of the participant;
identify one or more differences between the features of the current remote user device of the participant and the features of the one or more user devices or software previously utilized or accessed by the participant based on a comparison of the features of the current remote user device of the participant with the historic usage data of the participant in real time utilizing natural language processing;
determine that one or more tutorials in a database are related to the identified one or more differences; and
send one or more options to initiate the one or more tutorials to the current remote user device of the participant via the network connection.

11. The computer program product of claim 10, wherein the program instructions further cause the computing device to:
receive a selection of the one or more options from the current remote user device of the participant via the network connection; and
send the one or more tutorials to the current remote user device of the participant via the network connection based on the receiving the selection of the one or more options.

12. The computer program product of claim 10, wherein the program instructions further cause the computing device to electronically tag the one or more tutorials to indicate to the computing device that the one or more tutorials have been presented to the participant and are not to be considered tutorials related to the identified one or more differences in future determinations by the computing device.

13. The computer program product of claim 10, wherein:
the determining the current conditions of the current remote user device of the participant comprises analyzing one or more text-based documents with natural language processing to determine features of the current remote user device of the participant;
the determining the features of the one or more user devices or software comprises analyzing one or more additional text-based documents with natural language processing to identify the features of the one or more user devices or software; and
the identifying the one or more differences comprises comparing the features identified from the natural language processing of the one or more text-based documents with the features identified from the natural language processing of the one or more additional text-based documents.

14. The computer program product of claim 10, wherein the historic usage data of the participant comprises at least one of the group consisting of: user device purchase history, a user provided list of previously utilized user devices or software, installation history for software, and app store data.

15. The computer program product of claim 10, wherein the one or more differences comprise at least one function of the current remote user device of the participant.

16. The computer program product of claim 10, wherein the one or more differences comprise at least one of the group consisting of: different hotkeys or buttons for the same functionality; different default behaviors; different degrees of notification that can be enabled for the same functions; and different personal agent activations or commands.

17. A system for curating tutorials based on historic user data, comprising:
a CPU, a computer readable memory device and a computer readable storage medium associated with a computing device;
program instructions to obtain historic usage data for multiple participants from a remote central repository on a network, wherein the central repository is synched with a plurality of remote user devices of the participant on the network such that the historic usage data in the central repository is periodically or continuously updated;

program instructions to determine that the current remote user device of the participant is being utilized for a first time;

program instructions to automatically initiate an automated tutorial curation event based on the determining that the current remote user device of the participant is being utilized for the first time;

program instructions to determine features of the current remote user device of the participant utilizing natural language processing of data obtained from a remote database, the features comprises functions and characteristics of the current remote user device of the participant and functions and characteristics of software of the current remote user device of the participant;

program instructions to identify features of one or more user devices or software previously accessed by the participant based on the historic user data of the participant;

program instructions to determine features of the one or more user devices or software previously utilized by the participant based on historic user data of the participant;

program instructions to identify in real time, after the determining that a tutorial initiation event has occurred, one or more differences between the features of the current remote user device of the participant and the features of the one or more user devices or software previously utilized or accessed by the participant based on a comparison of the features of the current remote user device of the participant with the historic user data of the participant utilizing natural language processing;

program instructions to determine that a tutorial is related to the identified one or more differences; and program instructions to send an option to initiate the tutorial to the current remote user device of the participant;

wherein the program instructions are stored on the computer readable storage medium for execution by the CPU via the computer readable memory device.

18. The system of claim 17, wherein:

the determining the features of the current remote user device of the participant comprises analyzing one or more text-based documents with natural language processing to determine the features of the current remote user device of the participant;

the determining the features of the one or more user devices or software comprises analyzing one or more additional text-based documents with natural language processing to identify the features of the one or more user devices or software; and the identifying the one or more differences comprises comparing the features identified from the natural language processing of the one or more text-based documents with the features identified from the natural language processing of the one or more additional text-based documents.

19. The system of claim 17, wherein the historic usage data of the participant is based on at least of the group consisting of: user device purchase history; installation history for software; app store data; and a monitoring history from an application on the user device of the participant that monitors user actions.

* * * * *